Nov. 6, 1928.  
D. PARRETT  
TWO-WHEELED TRACTOR FOR CULTIVATORS AND OTHER  
MACHINES AND METHOD OF CONSTRUCTING SAME  
Filed Dec. 11, 1924  
1,690,205  
7 Sheets-Sheet 1

Inventor:  
Dent Parrett,  
by Wm F Freudenreich,  
Atty.

Nov. 6, 1928. 1,690,205
D. PARRETT
TWO-WHEELED TRACTOR FOR CULTIVATORS AND OTHER
MACHINES AND METHOD OF CONSTRUCTING SAME
Filed Dec. 11, 1924 7 Sheets-Sheet 4

Nov. 6, 1928. 1,690,205
D. PARRETT
TWO-WHEELED TRACTOR FOR CULTIVATORS AND OTHER
MACHINES AND METHOD OF CONSTRUCTING SAME
Filed Dec. 11, 1924   7 Sheets-Sheet 7

Patented Nov. 6, 1928.

1,690,205

UNITED STATES PATENT OFFICE.

DENT PARRETT, OF CHICAGO HEIGHTS, ILLINOIS.

TWO-WHEELED TRACTOR FOR CULTIVATORS AND OTHER MACHINES AND METHOD OF CONSTRUCTING SAME.

Application filed December 11, 1924. Serial No. 755,131.

The principal object of the present invention is to produce a simple and novel two wheeled tractor mainly out of standard automobile parts whereby old automobiles whose power plant, including the driving axle, are not too greatly worn, may be put to a beneficial use at a comparatively small cost.

Viewed in another of its aspects, my invention may be said to have for its object to produce a light two wheeled tractor at a much lower cost than it has been possible heretofore to make tractors, by utilizing to a large extent standard used automobile parts.

It is necessary to provide steering means for motor vehicles of any kind and therefore, viewed in one of its aspects, my invention may be said to have for its object to produce a simple and novel steering mechanism for a two wheeled tractor.

Viewed in another of its aspects my invention may be said to have for its object to produce a simple and novel steering and controlling means for a two wheeled tractor, which will permit the operator seated on a cultivator or other machine that is being drawn by the tractor, easily and conveniently to control the speed and direction of movement of the tractor.

Viewed in another of its aspects my invention may be said to have for its object to produce a simple and novel draft connection between a tractor and a drawn vehicle, which will permit the combined machines readily to adapt themselves to any qualities in the ground over which they are traveling, and thus avoid the creation of injurious stresses.

A further object of the invention is to provide a two-wheeled tractor employing a transversely arranged driving shaft casing together with driving connections between the driving shafts and the carrying wheels so arranged that the carrying wheels may be positioned within the planes of the driving connections so that a standard driving shaft casing together with its driving parts may be employed but at the same time the carrying wheels so positioned as to permit them to travel in proper relation to corn rows or other plants under cultivation.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Fig. 8 is a top plan view of the parts shown in Fig. 7.

In the drawings I have illustrated a construction made out of parts of Ford cars and, since this is the construction that will ordinarily be most useful, I shall confine the detailed description to this particular form of the invention; although it will of course be understood that there are other types of automobiles that lend themselves satisfactorily to this use.

The most expensive parts of a two wheeled tractor possessing both power and flexibility of control are the motor, the transmission, and the differential driving shaft, and it is the purpose of the present invention to make possible the use of these elements, including the controlling levers or pedals. A tractor adapted for cultivating would have too wide a tread, if the traction wheels were placed on the ends of the ordinary rear axle and I have therefore devised an arrangement in which the traction wheels are carried by one axle and are simply driven from a second axle which is the standard rear axle of an automobile. The engine or power plant and the transmission may be used without change, provided a simple adapter is employed to connect the casing of the transmission to the casing for the rear axle. The new parts required for the body of the tractor are therefore only a simple framework, a simple axle, the adapter, and driving means between the automobile axle and the traction wheels.

Figure 4:
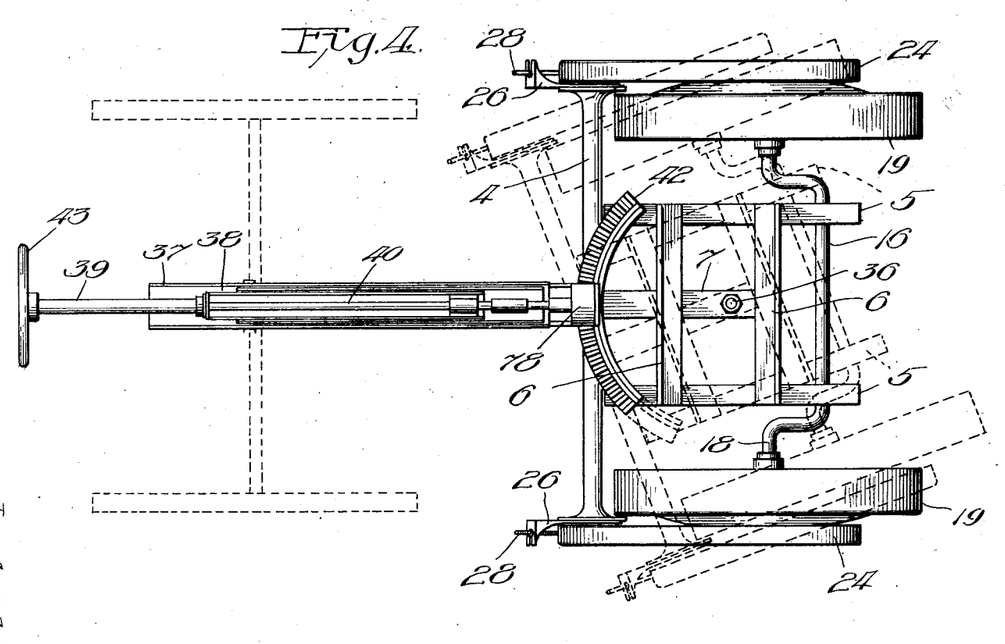
Fig. 4 is a top plan view of the tractor, showing only the frame, the traction wheels and the driving shaft, together with the steering and draft tongue.
Figure 12:
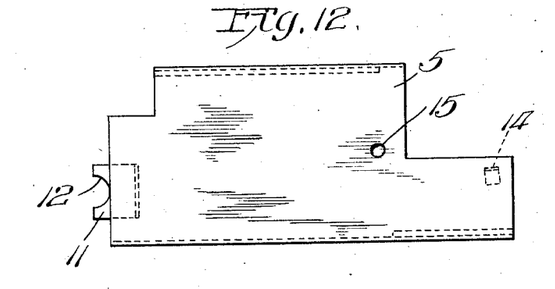
Fig. 12 is a side view of one of the side plates of the main frame.
Figure 13:
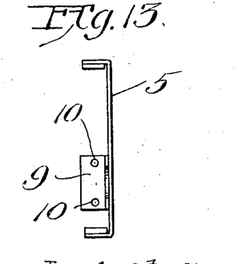
Fig. 13 is an end view of the side plate.

Having in view only the simplest embodiment of the invention, the construction is readily apparent from the drawings, wherein 1 represents a standard Ford automobile power plant mounted on its supporting frame members 2 that are cut off a short distance in rear of the power plant. 3 is the standard transmission and 4 represents the complete rear axle with its differential and casing. The frame on which the foregoing parts are mounted is made of two wide vertical channels 5 constituting side plates; one of these side plates being shown separately in Figs. 12 and 13; together with two cross pieces 6, 6 that may be in the form of angle irons as best shown in Fig. 4, these cross pieces resting on and being secured to the upper flanges of the side plates; and a longitudinal center piece 7 attached to the cross pieces.

Figure 7:
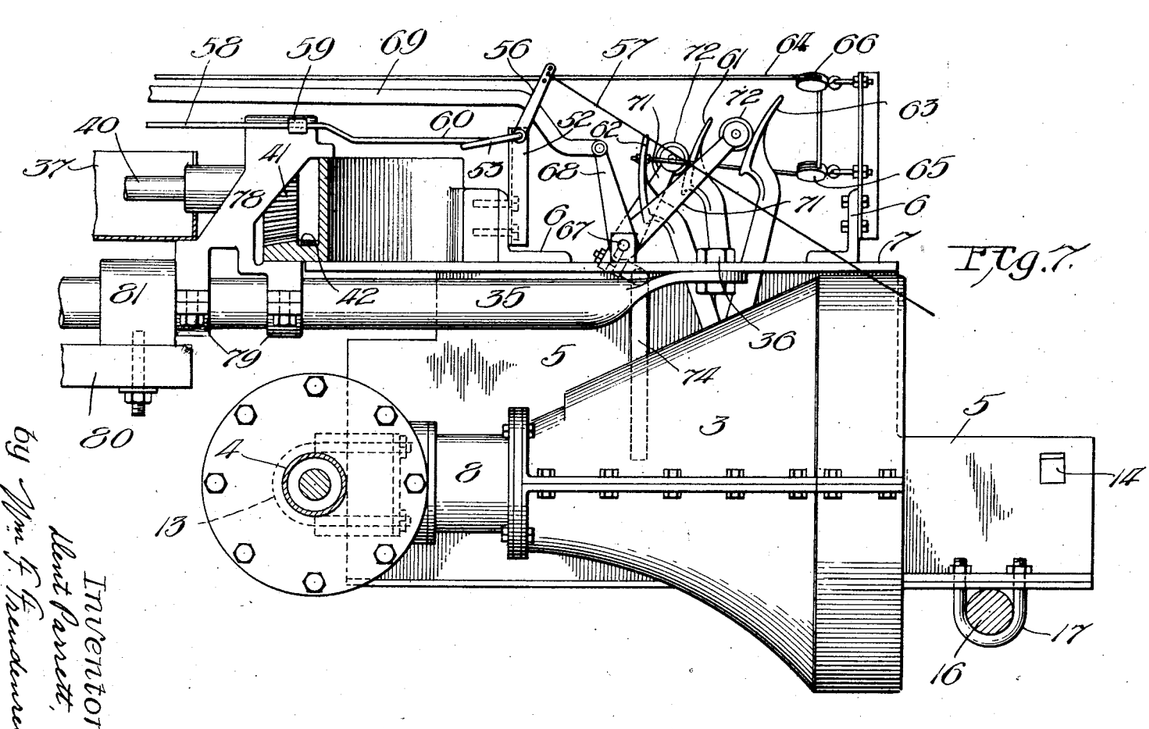
Fig. 7 is a view partly in section and partly in elevation, on an enlarged scale, through the body of the tractor, the motor and the traction wheels being omitted.

As best shown in Fig. 7, the casing of the transmission 3 and the differential casing of the axle 4 are connected together into a rigid unit by means of a short tubular adapter 8. To the rear end of each of the side plates is fastened by rivets or other suitable fastening devices (not shown) an angle plate one flange 9 of which extends at right angles to the plane of the vertical portion of the plate and is provided with two holes 10, 10; while the other flange, 11 lies against the side plate and projects beyond the rear edge of the latter where it is provided with a semi-circular notch 12. The casing for the rear axle fits into the notches of the two angle plates and is held therein by two U-bolts 13, the arms of which pass through the holes 10 in the angle plates and are provided with nuts by means of which the bolts are drawn tightly in place. Each side plate is provided on the inner side, below the longitudinal center line and adjacent to the front end with a projection 14 and, at a considerable distance in rear of the projection, with a hole 15. The parts are so proportioned that when the power plant is properly placed between the side plates, its supporting frame members 2 rest on the projections 14 while a bolt or pin passes through each of the holes 15 in the side plates and through the adjacent frame members of the power plant, locking the power plant in place.

Figure 2:
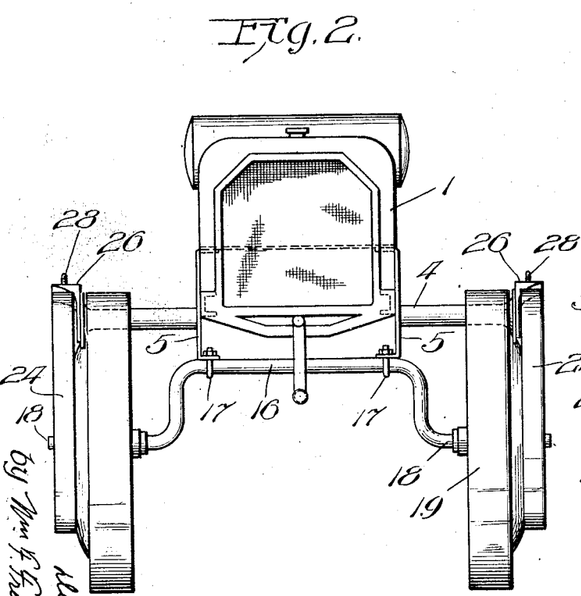
Fig. 2 is a front view.
Figure 3:
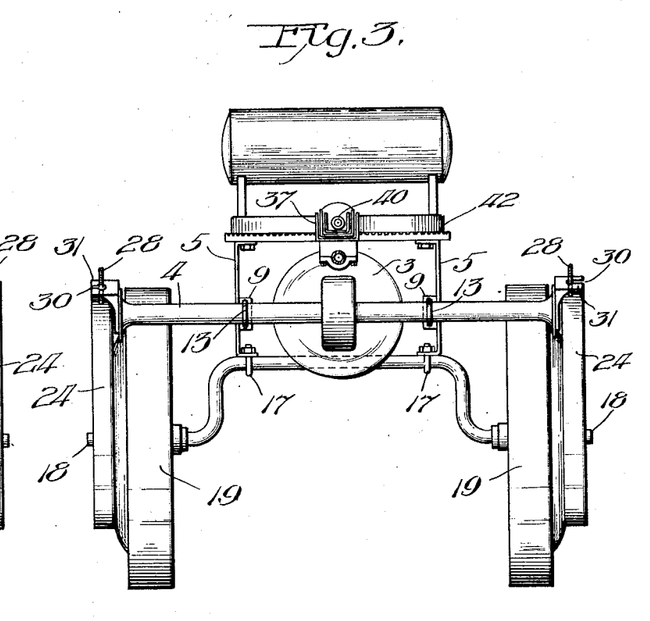
Fig. 3 is a section taken approximately on line 3—3 of Fig. 1, the cultivator being omitted.
Figure 5:
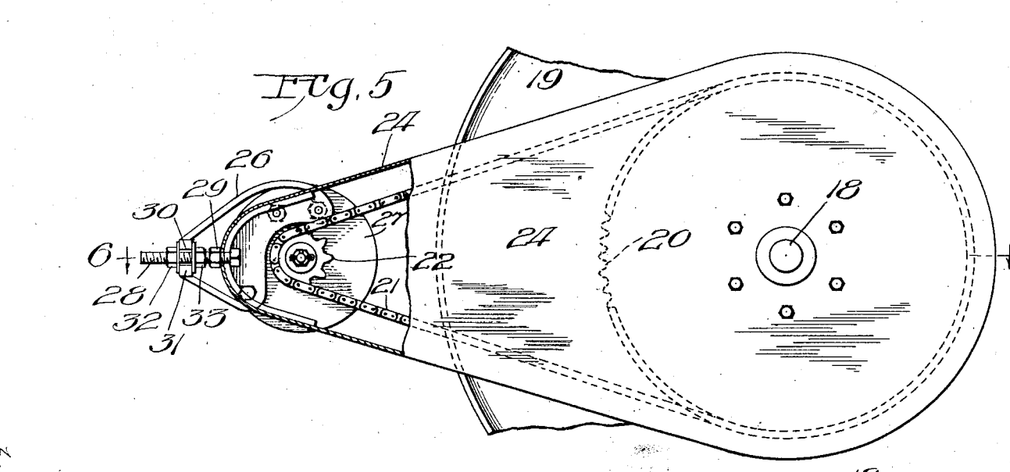
Fig. 5 is a side elevation on an enlarged scale, a part of the housing being broken away, of the driving mechanism between the standard automobile axle and one of the traction wheels.
Figure 6:
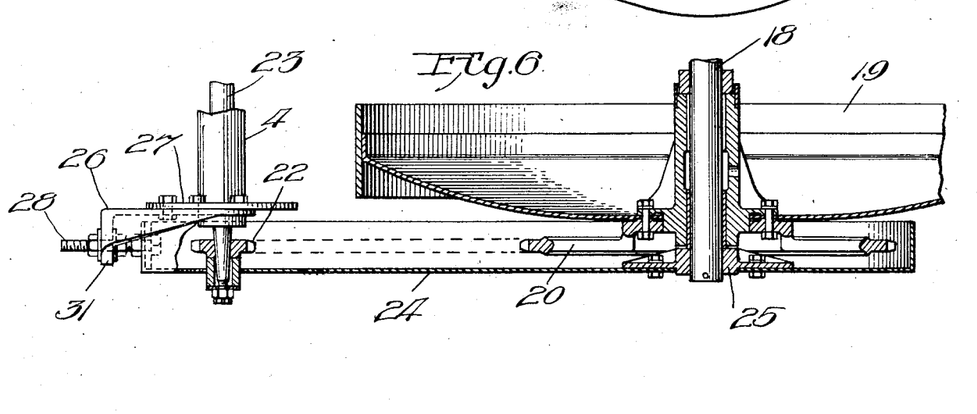
Fig. 6 is a section taken approximately on line 6—6 of Fig. 5.

The support for the body of the tractor is in the form of an axle 16 shaped like a wide inverted U. This axle is fastened to the side plates by means of U-bolts 17 embracing the horizontal portion of the axle and passing up through the lower flanges of the side plate as best shown in Figs. 2, 3 and 7. The axle 16 thus serves not only as the vehicle axle but also as a cross connection between the lower edges of the side pieces of the main frame. On the lower ends of the depending arms of the axle are horizontal outwardly directed journal members 18, 18. Traction wheels 19 are rotatably supported on these journals. As best shown in Figs. 5 and 6, each traction wheel has thereon a large sprocket wheel 20 and there is a sprocket chain 21 extending around this wheel and a small sprocket wheel 22 on the rotatable member 23 of the rear axle device 4. It will be seen that the sprocket wheels 22 occupy the positions ordinarily taken by the rear wheels of the automobile, whereas the traction wheels 19 may be placed as close together as desired, and yet permit an effective driving connection to be provided from the axle 4, without making any change in the latter.

Each set of sprocket wheels and its driving chain is enclosed within a suitable housing 24 that is connected both to the axle 4 and to the supporting axle for the machine. These housings serve a double purpose because they not only cover the driving gearing, but also act as rigid frame members that tie the ends of the two axles together and thus prevent the U-shaped axle from swinging about the longitudinal axis of its horizontal upper portion. The housings may, in fact, serve a third purpose which is that of taking up slack in the driving chains, and the arrangement shown is adapted to accomplish this purpose. The journals or skeins 18 simply pass through thickened hub-like portions 25 on the housings. The rear end of each housing is connected to a bracket 26 secured to the adjacent flange 27 on the casing of the axle 4, by means of a bolt 28. This bolt passes through the end of the housing, the head being on the inner side of the housing and there being a nut 29 on the outer side, so that the bolt is rigidly connected to the housing. The bolt passes through a hole, preferably in the form of an open jaw 30 in a lip 31 of the bracket 26, and there are nuts 32 and 33 on the bolt on opposite sides of this lip. By adjusting the nuts 32 and 33, the housing may be moved bodily, forwardly or rearwardly, and be locked in any adjusted position.

Figure 1:
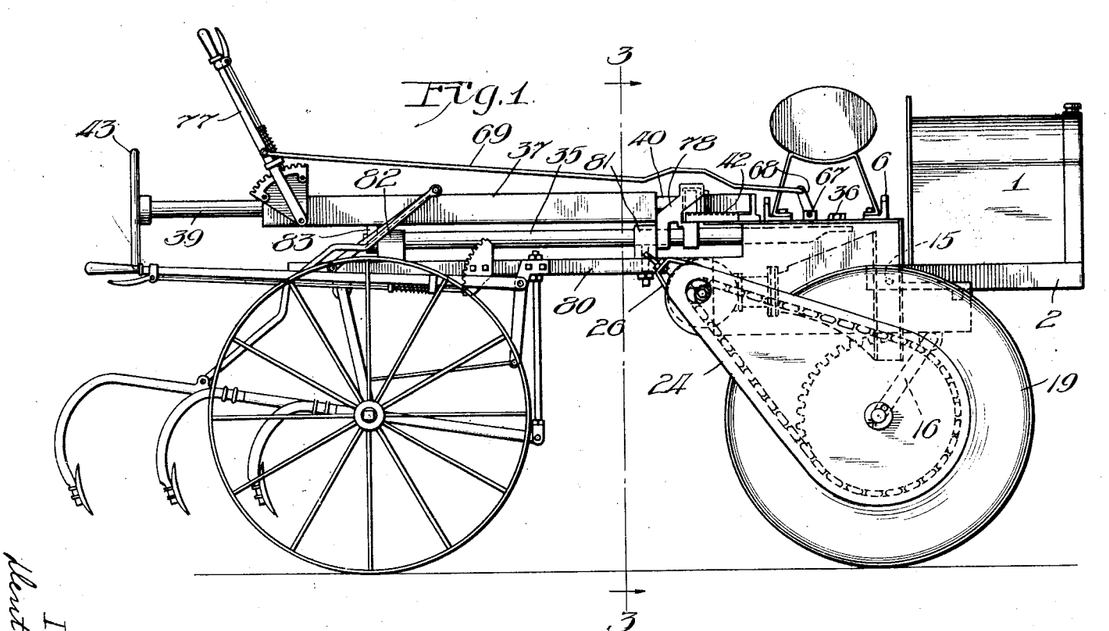
Figure 1 is a side view of a machine arranged in accordance with my invention, attached to a cultivator.

For steering purposes that portion of the tractor thus described should be rotatable, preferably about an axis passing vertically approximately through its center of gravity and through the axis of rotation of the traction wheels. I have therefore provided the tractor with a draw bar 35 underlying the longitudinal central frame member 7 and secured at its front end to the latter by a bolt 36. This pivotal connection is placed far behind the horizontal portion of the supporting axle, but the depending arms of this axle extend rearwardly as well as downwardly, as best shown in Fig. 1, so that the axis of rotation of the traction wheels is approximately below the pivotal connection between the draw bar and the body of the tractor. The point of this pivotal connection is also approximately in a vertical line containing the center of gravity of the structure.

Figures 10, 11:
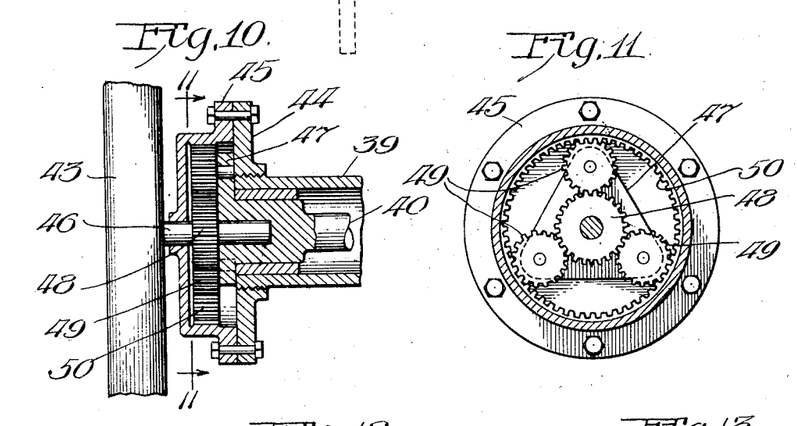
Fig. 10 is an axial section through the steering post adjacent to the steering wheel, the latter being shown in elevation.
Fig. 11 is a section taken approximately on line 11—11 of Fig. 10.

The draw bar is adapted to be attached to the vehicle or machine to be drawn, and means are provided for controlling the speed and the direction of movement of the tractor unit from a point in the rear such, for example, as the driver's seat of a cultivator. In the arrangement shown, there is a trough-like part 37 arranged above, attached to, and extending parallel with the draw bar. Lying within the trough or channel 37 is a shorter narrower channel 38 to the rear end of which is fixed a tubular steering post 39, as best shown in Fig. 4. Through the steering post and the channel 38 extends a steering shaft 40, on the front end of which is fixed a pinion 41 best shown in Fig. 7. This pinion meshes with a curved rack 42 fixed to the frame of the tractor unit and having its center at the pivot point 36. It will be seen that when the steering shaft is turned in one direction or the other, the pinion acts on the rack and causes the rack to move toward the right or the left, thus swinging the tractor unit about the pivot point 36; Fig. 4 showing, in full lines, the tractor unit positioned to travel straight ahead and, in dotted lines, the unit swung into position to permit it to turn to the left. Unless the steering wheel be made unduly large, it may be difficult to steer, if the steering wheel is fastened directly to the steering shaft. I have therefore arranged between the steering wheel 43 and its shaft, as best shown in Figs. 10 and 11, a reduction gearing, so as to give the driver the benefit of a long leverage. Referring to Figs. 10 and 11, 44 represents a flange or head fixed to the rear end of the steering post, and 45 is a shallow cup-shaped casing or housing bolted or otherwise fastened to the member 44 to form with the latter a gear compartment. The steering wheel has a stub shaft 46 extending through the center of the casing 45 and having a bearing in the rear end of the steering shaft 40. The steering shaft has a flange or enlargement 47 lying within the gear compartment. On the stub shaft 46 is a pinion 48 that meshes with a plurality of pinions 49 distributed about the same and rotatably mounted on the flange or head 47. The pinions 49 mesh with internal gear teeth 50 on the annular wall of the casing 45. It will thus be seen that when the steering wheel is turned, the pinion 48 thereon rotates the pinions 49 and, as the latter pinions mesh with the stationary internal gear, they must run along the same, carrying the head or enlargement 47 and, the steering shaft with them. Consequently the steering shaft is rotated much more slowly than the steering wheel or, in other words, a large angular movement of the steering wheel produces only a small angular movement of the steering shaft.

The standard foot pedals for controlling the motor and the brake are employed, but I have provided a special device for controlling the throttle and shall first describe this feature. Referring to Figs. 7 and 8, it will be seen that on the rear cross member 6 of the main frame, near the ends of the latter are two vertical posts 52. A bail made of short arms 53 and a long connecting piece 54 is pivoted to the upper ends of these posts, the pivotal connection illustrated being made by bending the free ends of the arms 53 inwardly, as indicated at 54, and passing them through holes in the posts, so that the long rod or bar 55 lies just in front of and is symmetrically disposed with respect to the curved rack. Fixed to one end of the bail is a lever arm 56 to the free end of which is attached the controlling wire or cable 57 for the throttle. Normally the bail is held so that it lies approximately in a horizontal plane. By pressing down on the bar 54 of the bail, the controlling lever 54 is swung back and therefore pulls on the throttle wire or cable. The controlling means for the bail consists of a rod 58 extending lengthwise of the channel 37 and conveniently supported by the latter in bearings 59, of which one is shown, so as to be rotatable about its long axis. A section 60 at the front end of this rod is displaced laterally from the main portion of the rod, but lies parallel thereto forming, as it were, an elongated crank pin. The part 60 is of such length and is so disposed that some portion thereof always overlies the part 54 of the bail so that, no matter into what position the tractor unit is swung for steering purposes, a predetermined angular movement of the controlling rod will always produce a predetermined swinging movement of the bail.

Figure 9:
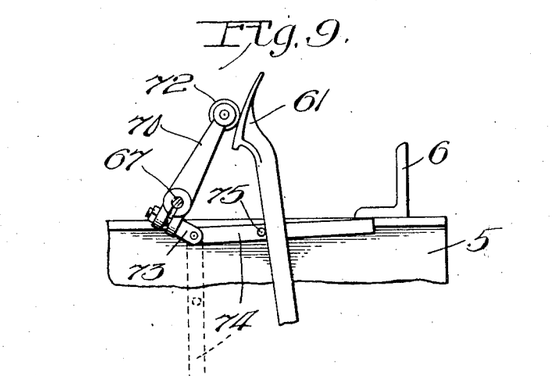
Fig. 9 is a detail showing an attachment for operating the clutch pedal.

61, 62 and 63 represent respectively the usual clutch pedal, reverse pedal and brake pedal. The reverse pedal is operated by a simple cable 64 or other flexible member, passing over idle pulleys 65 and 66, as best shown in Figs. 7 and 8; the cable extending rearwardly to the operator's position. The other two pedals are controlled from a transverse shaft 67 mounted on the main frame, in rear of the pedals; the shaft having a rocker arm 68 fixed thereto, and the rocker arm being actuated by means of a rod 69 extending rearwardly. Fixed to the shaft 67 are two radial arms 70 and 71, provided at their free ends with rollers 72. The roller on the arm 70 is adapted to engage with the pedal 61, and the roller on the arm 71 is adapted to engage with the pedal 63. When the pedal 63 is pushed forward as far as it will go the brakes are applied. The pedal 61, in the type of automobile under consideration, has three positions, a forward position which is for low speed, intermediate or neutral position, and a rear position which is the high speed position. It will thus be seen that when the actuating shaft 67 is turned, the brakes will be off in the high speed position and on in the neutral and the low speed positions of the pedal 61. Ordinarily the machine will be operated on high speed but, as it may sometimes be desirable to operate it at low speed, I have provided a simple arrangement for causing the pedal 61 to be moved into its forward or low speed position by the movement of the actuating rock shaft that would normally permit the pedal to assume its high speed position. This detail is best shown in Fig. 9. The rocker arm 70 is extended downwardly beyond the shaft 67 and there is provided with an ear 73. Pivotally connected at one end to this ear is a bar 74 having thereon a laterally projecting pin 75. Normally, when the machine is to be operated on high speed, the bar 74 hangs down in the position shown in dotted lines. When it is desired to operate on low speed, the bar is swung up into the position shown in full lines, bringing the pin 75 into engagement with the shank or stem of the pedal. Then, when the rocker arm 71 is swung back, the pedal 61, instead of following the rocker arm, is pushed forward by the pin 75 and assumes its low speed position while, at the same time, the brakes remain off.

The controls, as heretofore stated, are carried rearwardly in proximity to the steering wheel, but in the main figure, Fig. 1, I have omitted all of the controls except the rod 69 that actuates the rock shaft 67. This rod extends rearwardly to a hand lever 77 pivotally supporting at its lower end to the rear end of the trough or channel 37.

It will be seen from an inspection of Fig. 8 that the controlling cable 64, leading rearwardly from the pulley 66, and the controlling rod 69 are arranged close to the pivotal point 36 so that there will be no material effect on these elements when the tractor unit is turned somewhat toward the right or the left in steering.

In Figs. 1 and 7 I have illustrated a means whereby a cultivator may be attached to the draw bar. It will be seen that the support for the front end of the steering shaft is a heavy bracket 78 that also forms a partial housing for the pinion 41. This bracket is firmly clamped to the draw bar by means of suitable clamping devices 79. 80 represents the tongue of an ordinary cultivator. Near the front and rear ends of this tongue are fastened blocks 81 and 82 respectively. The draw bar 35 passes through openings in these blocks. The front block rests against the rear face of the bracket 78 while the rear block rests against a part 83 fixed to the rear end of the draw bar and serving as a support for the rear portion of the trough or channel 37. It will thus be seen that the cultivator tongue is held against movements relative to the draw bar in the direction of the length of the latter; but, since the draw bar simply passes through openings or bearings in the blocks on the tongue, the draw bar is permitted to rotate in these blocks. Therefore if one of the wheels of the tractor drops into a depression or rides over an obstruction, the entire tractor unit simply oscillates about the longitudinal axis of the draw bar, thus avoiding the imposition of objectionable stresses.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In a machine of the character described, a frame, a power plant mounted on said frame, a transverse driving shaft casing immovably secured to said frame, an inverted U-shaped wheel axle pivotally mounted on said frame having wheel journals, said axle being pivoted to said frame in a manner to permit its journals to swing to or from said casing, and adjustable rigid connections between the ends of said casing and said axle to adjust the position of said journals and hold the same against swinging movement.

2. In a machine of the character described, a frame, a power plant mounted on said frame, a transverse driving shaft casing immovably secured to said frame in the rear of said power plant, a driving shaft rotatably mounted in said casing, an inverted U-shaped wheel axle having wheel journals pivotally mounted on said frame in a manner to permit said journals to be swung to or from said casing, traction wheels on said journals, driving mechanism between the ends of said shaft and said wheels, and adjustable protecting housings for said mechanism each connected at one end to an end of said casing and at its outer end to the said wheel axle.

3. In a machine of the character described, a frame, a power plant mounted on said frame, a transverse driving shaft casing immovably secured to said frame, a drive shaft therein, an inverted U-shaped wheel axle having wheel journals located at some distance from the drive shaft, said wheel axle being so pivoted to said frame as to permit the journals to be swung forwardly and rearwardly, wheels on said journals, driving connections between said drive shaft and said wheels, and adjustable connections between the ends of said casing and said wheel journals to swing said journals forwardly and rearwardly to adjust said driving connections and hold said journals stationary.

4. In a machine of the character described, a frame, a transverse driving shaft casing secured to the frame, an axle in the form of an inverted U hung from the frame in advance of said casing, journals on the lower ends of the depending arms of said axle, traction wheels on said journals, a driving shaft in said casing, driving connections between the ends of said shaft and said wheels, and ties between the ends of said casing and the ends of said axle in the vicinity of the journals for holding the axle against swinging movements.

5. In a machine of the character described, a frame, a transverse driving shaft casing secured to said frame, an axle in the form of an inverted U hung from the frame in advance of said casing so as to be capable of swinging about an axis parallel with said casing, journals projecting laterally from the lower ends of the depending arms of said axle, traction wheels on said journals, a driving shaft in said casing, a sprocket chain drive between each end of said shaft and the corresponding traction wheel, and housings for said chain drives each connected at one end to one end of said casing and at the other end to the corresponding journal on the axle.

6. In a machine of the character described, a frame, a transverse driving shaft casing secured to said frame, an axle in the form of an inverted U hung from the frame in advance of said casing so as to be capable of swinging about an axis parallel with said casing, journals projecting laterally from the lower ends of the depending arms of said axle, traction wheels on said journals, a driving shaft in said casing, a sprocket chain drive between each end of said shaft and the corresponding traction wheel, and housings for said chain drives each connected at one end to one end of said casing and at the other end to the corresponding journal on the axle, the connection at one end of each of said housings being constructed and arranged to permit the housing to be adjusted in the direction of its length to vary the distance between the corresponding journal and the driving shaft.

7. In a machine of the character described, a drawbar, a tractor unit pivoted to said drawbar to swing about a vertical axis, a controlling device on said unit comprising a long transverse rod mounted to swing about an axis spaced apart thereupon and arranged parallel thereto, and an actuating member movable with said drawbar and having a long crank overlying and extending transversely of said rod.

8. In a structure of the character described, a frame, a power plant mounted on said frame, a transverse driving shaft casing immovably mounted on said frame at the rear of and in close proximity to said power plant, a driving shaft projecting from each end of said casing, sprocket wheels on the ends of said driving shaft, an inverted U-shaped wheel axle pivotally mounted on said frame forward of said casing, carrying wheels journaled on said axle in vertical planes between the vertical planes of said driving shaft sprocket wheels, sprocket wheels connected with the outer sides of said carrying wheels in line respectively with the driving sprocket wheels, a chain running directly from each driving sprocket wheel to the corresponding sprocket wheel on the carrying wheels, and a rigid adjustable connection between said casing and the side portions of said axle.

9. In a structure of the character described, a frame, a power plant mounted on said frame, a transverse driving shaft casing immovably mounted on said frame at the rear of and in close proximity to said power plant, a driving shaft projecting from each end of said casing, sprocket wheels on the ends of said driving shafts, an inverted U-shaped wheel axle pivotally mounted on said frame forward of said casing, carrying wheels journaled on said axle in vertical planes between the vertical planes of said driving shaft sprocket wheels, sprocket wheels connected with the outer sides of said carrying wheels in line respectively with the driving sprocket wheels, a chain running directly from each driving sprocket wheel to the corresponding sprocket wheel on the carrying wheels, and a rigid housing for each sprocket chain connected at one end to said shaft casing and at the other end with said wheel axle.

10. In a structure of the character described, a frame, a power plant mounted on the frame, a transverse driving shaft casing secured to the frame immovably at the rear of and in close proximity to said power plant, a wheel axle arranged parallel with said casing and pivotally mounted on said frame, said axle having depending arms, carrying wheels journaled on said depending arms, driving shafts in said casing and projecting from the ends thereof, a sprocket wheel on the end of each driving shaft, a sprocket wheel connected with the outside of each carrying wheel in line with the corresponding driving shaft sprocket wheel, chains running over said sprocket wheels, with the carrying wheels located in vertical planes between the vertical planes of the driving shaft sprocket wheels, a rigid connection between the ends of said casing and said wheel axle, each of said rigid connections being adjustably secured to said casing to swing the depending arms of said wheel axle.

In testimony whereof, I sign this specification.

DENT PARRETT.